United States Patent
Oba

(10) Patent No.: US 10,254,809 B2
(45) Date of Patent: Apr. 9, 2019

(54) INFORMATION PROCESSING APPARATUS HAVING POWER SAVING FUNCTION, CONTROL METHOD FOR INFORMATION PROCESSING APPARATUS, STORAGE MEDIUM, AND INFORMATION PROCESSING SYSTEM

(71) Applicant: CANON KABUSHIKI KAISHA, Tokyo (JP)

(72) Inventor: Yoshitaka Oba, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/796,039

(22) Filed: Jul. 10, 2015

(65) Prior Publication Data

US 2016/0011637 A1    Jan. 14, 2016

(30) Foreign Application Priority Data

Jul. 14, 2014 (JP) .................................. 2014-144215

(51) Int. Cl.
  *G06F 1/26* (2006.01)
  *G06F 1/32* (2006.01)
  *G06F 1/3234* (2019.01)
  *G06F 1/3215* (2019.01)

(52) U.S. Cl.
  CPC ............ *G06F 1/266* (2013.01); *G06F 1/263* (2013.01); *G06F 1/3215* (2013.01); *G06F 1/3284* (2013.01); *Y02B 60/1267* (2013.01); *Y02B 60/41* (2013.01); *Y02D 10/159* (2018.01); *Y02D 30/10* (2018.01)

(58) Field of Classification Search
  CPC ........ G06F 1/266; G06F 1/3215; G06F 1/3284
  See application file for complete search history.

(56) References Cited

U.S. PATENT DOCUMENTS

| 2005/0007628 A1* | 1/2005 | Yamano ................. G06F 1/3203 358/1.15 |
| 2005/0128515 A1 | 6/2005 | Ohno |
| 2007/0285709 A1* | 12/2007 | Yamasaki ............. G06F 3/1208 358/1.15 |

(Continued)

FOREIGN PATENT DOCUMENTS

| JP | 2005196741 A | 7/2005 |
| JP | 2009201060 A | 9/2009 |

(Continued)

OTHER PUBLICATIONS

Office Action issued in Japanese Appln. No. 2014-144215 dated May 15, 2018.

*Primary Examiner* — Jaweed A Abbaszadeh
*Assistant Examiner* — Gayathri Sampath
(74) *Attorney, Agent, or Firm* — Rossi, Kimms & McDowell LLP

(57) ABSTRACT

An information processing apparatus which is capable of properly supplying power to an image processing unit and an image output unit from respective different power supplies without using a control instruction. The image processing unit obtains data from an external apparatus. A type of the obtained data is determined, and supply of power to the image processing unit and the image output unit is controlled based on the determined type of the data.

17 Claims, 11 Drawing Sheets

(56) References Cited

U.S. PATENT DOCUMENTS

| | | | |
|---|---|---|---|
| 2009/0282278 A1* | 11/2009 | Satoh | G06F 1/3209 713/321 |
| 2011/0035739 A1* | 2/2011 | Harada | G06F 1/3203 717/168 |
| 2011/0040992 A1* | 2/2011 | Mizunashi | H04L 12/10 713/310 |
| 2011/0078465 A1* | 3/2011 | Ito | G06F 1/3203 713/300 |
| 2011/0191614 A1* | 8/2011 | Tsuzuki | G06F 1/32 713/320 |
| 2011/0219249 A1* | 9/2011 | Kuwahara | G06F 1/00 713/323 |
| 2013/0084812 A1* | 4/2013 | Churei | H04W 52/028 455/73 |
| 2013/0212418 A1* | 8/2013 | Ueda | G06F 1/3287 713/323 |

FOREIGN PATENT DOCUMENTS

| | | | | |
|---|---|---|---|---|
| JP | 2010206241 | * | 9/2010 | G06F 3/12 |
| JP | 2011071760 A | | 4/2011 | |

* cited by examiner

INFORMATION PROCESSING APPARATUS HAVING POWER SAVING FUNCTION, CONTROL METHOD FOR INFORMATION PROCESSING APPARATUS, STORAGE MEDIUM, AND INFORMATION PROCESSING SYSTEM

BACKGROUND OF THE INVENTION

Field of the Invention

The present invention relates to an information processing apparatus, a control method for the information processing apparatus, a storage medium, and an information processing system.

Description of the Related Art

Recent information processing apparatuses have a power saving function to reduce power consumption by, for example, switching between two power states, i.e. a state in which power is supplied to all component elements which an information processing apparatus has (hereafter referred to as "the normal state") and a state in which no power is supplied to all or part of component elements which an information processing apparatus has (hereafter referred to as "the power-saving state").

Specifically, when no operation is performed in an information processing apparatus in the normal state even after a lapse of a predetermined time period, the power state of the information processing apparatus switches from the normal state to the power-saving state, and when the information processing apparatus in the power-saving state receives print data, the power state of the information processing apparatus switches from the power-saving state to the normal state.

As an example of information processing apparatuses having the power-saving function described above, there is known an information processing apparatus which has an image processing unit and an image output unit and in which power is supplied to the image processing unit and the image output unit from a common power supply (see, for example, Japanese Laid-Open Patent Publication (Kokai) No. 2005-196741). In the information processing apparatus described in Japanese Laid-Open Patent Publication (Kokai) No. 2005-196741, a control instruction for controlling the common power supply which supplies power to the image processing unit and the image output unit is included in received print data, and the common power supply is controlled based on this control instruction when the power state switches from the power-saving state to the normal state.

To increase the effect of reducing power consumption, it is being contemplated that two power supplies for the image processing unit and the image output unit, respectively, are provided, and supply of power from each of the power supplies is controlled to switch between the power-saving state and the normal state for the image processing unit and the image output unit individually.

However, a control instruction in the information processing apparatus described in Japanese Laid-Open Patent Publication (Kokai) No. 2005-196741 presupposes that the information processing apparatus is caused to switch between the power-saving state and the normal state by controlling one power supply. Therefore, even if a control instruction in the information processing apparatus described in Japanese Laid-Open Patent Publication (Kokai) No. 2005-196741 is used when power is supplied from the two power supplies for the image processing unit and the image output unit, the two power supplies cannot be individually controlled based on this control instruction. As a result, power may not be properly supplied to the image processing unit and the image output unit from the respective different power supplies.

SUMMARY OF THE INVENTION

The present invention provides an information processing apparatus and a control method therefor, which are capable of properly supplying power to an image processing unit (data obtaining unit) and an image output unit (data processing unit) from respective different power supplies without using a control instruction, a storage medium, and an information processing system.

Accordingly, the present invention provides an information processing apparatus having a data obtaining unit, which obtains data from an external apparatus, and a data processing unit, comprising a control unit configured to control each of the following: power that is supplied to the data obtaining unit and power that is supplied to the data processing unit, and a determination unit configured to determine a type of the obtained data, wherein the control unit controls supply of power to the data obtaining unit and the data processing unit based on the determined type of the data.

According to the present invention, a type of obtained data is determined, and based on the determined type of the obtained data, supply of power to the data obtaining unit and the data processing unit is controlled. As a result, power is properly supplied to the data obtaining unit and the image output unit from respective different power supplies without using a control instruction.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
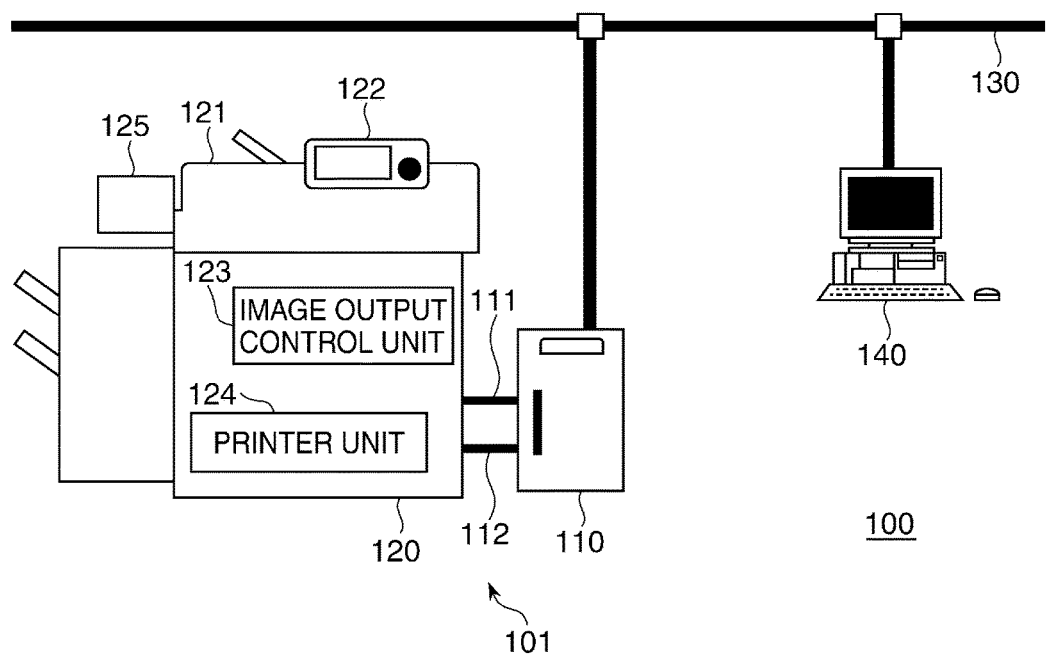
FIG. 1 is a block diagram schematically showing an arrangement of an information processing system including an information processing apparatus according to an embodiment of the present invention.

FIG. 1 is a block diagram schematically showing an arrangement of an information processing system 100 including an information processing apparatus 101 according to an embodiment of the present invention.

The information processing system 100 in FIG. 1 has the information processing apparatus 101 and a client PC 140, and the information processing apparatus 101 has an image processing apparatus 110 (data obtaining unit) and an image output apparatus 120 (data processing unit). The image output apparatus 120 has a scanner unit 121, an operating unit 122, an image output control unit 123, a printer unit 124, and a fax unit 125. The image processing apparatus 110 and the client PC 140 are connected together via a LAN 130, and the image processing apparatus 110 and the image output apparatus 120 are connected together via a LAN 111 and a video cable 112.

The scanner unit 121 reads an original and obtains image data corresponding to the original. The operating unit 122 has hardware keys and an operating panel, and a user inputs instructions to the information processing apparatus 101 through the hardware keys and the operating panel. It should be noted that the operating panel may have, for example, a liquid crystal monitor, and on this liquid crystal monitor, for example, information on the information processing apparatus 101 is displayed.

The image output control unit 123 controls operation of the scanner unit 121, the printer unit 124, and so on. The printer unit 124 prints, for example, image data obtained by the scanner unit 121. The fax unit 125 is connected to a telephone line, not shown, and sends and receives data to and from an external apparatus, not shown, via the telephone line.

Figure 2:
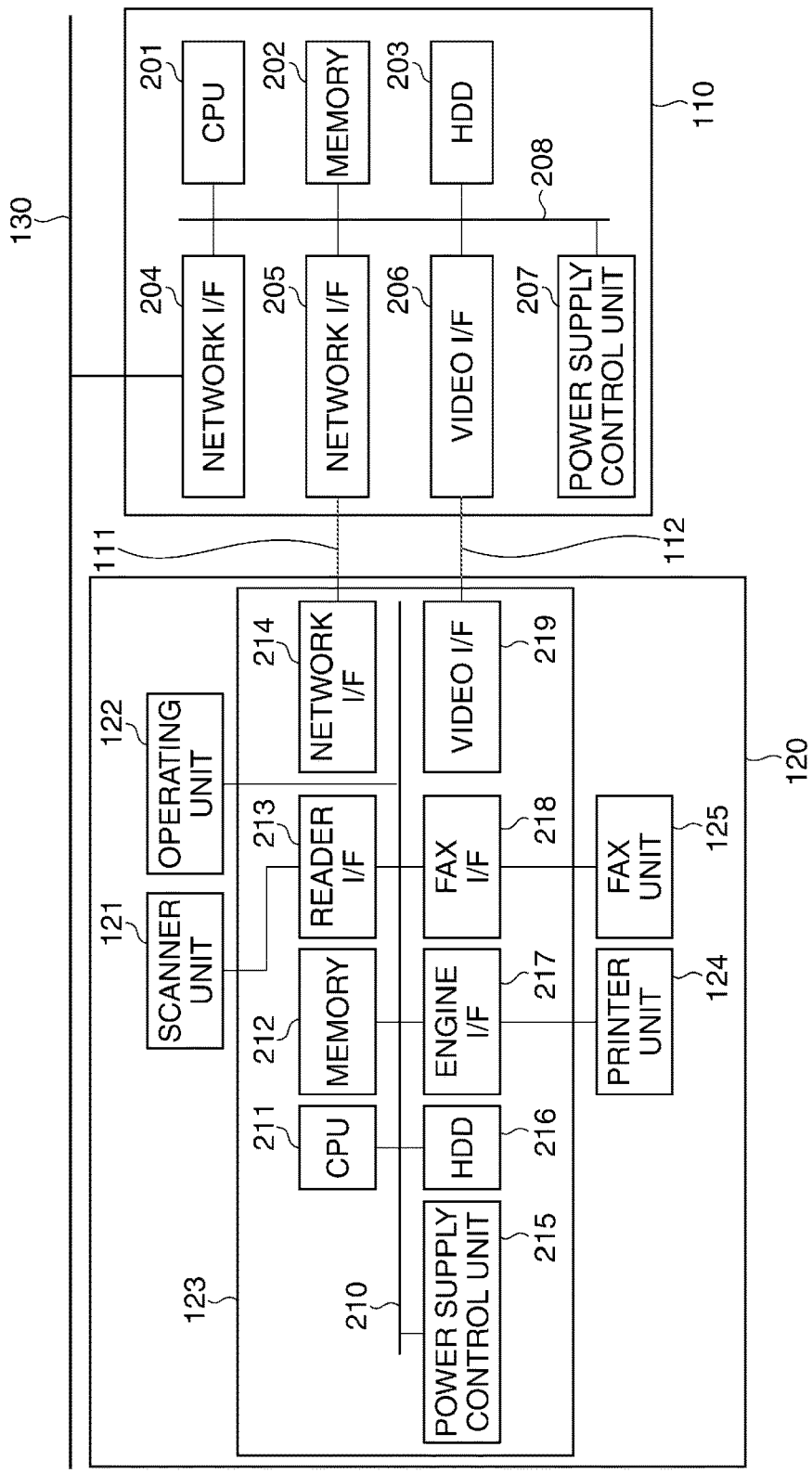
FIG. 2 is a block diagram schematically showing internal arrangements of an image processing apparatus and an image output apparatus in FIG. 1.

FIG. 2 is a block diagram schematically showing internal arrangements of the image processing apparatus 110 and the image output apparatus 120.

The image processing apparatus 110 in FIG. 2 has a CPU 201, a memory 202, an HDD 203, network I/Fs 204 and 205, a video I/F 206, and a power supply control unit 207 (control unit), and these component elements are connected to one another via a system bus 208.

The CPU 201 controls the component elements of the image processing apparatus 110 and executes programs stored in the memory 202 and the HDD 203. The memory 202 is a work memory for the CPU 201. The HDD 203 is a high-capacity storage device and stores, for example, image data.

The network I/F 204 connects the image processing apparatus 110 and the LAN 130 together, the network I/F 205 connects the image processing apparatus 110 and the LAN 111 together, and the video I/F 206 connects the image processing apparatus 110 and the video cable 112 together. The power supply control unit 207 controls power which is supplied to the component elements of the image processing apparatus 110.

The image output apparatus 120 in FIG. 2 has the scanner unit 121, the operating unit 122, the image output control unit 123, the printer unit 124, and the fax unit 125, and the image output control unit 123 has a CPU 211, a memory 212, a reader I/F 213, a network I/F 214, a power supply control unit 215, an HDD 216, an engine I/F 217, a fax I/F 21 218, and a video I/F 219, and these component elements are connected to one another via a system bus 210.

The CPU 211 controls the component elements of the image output apparatus 120 and executes programs stored in the memory 202 and the HDD 203. The memory 212 is a work memory for the CPU 211. The reader I/F 213 connects the scanner unit 121 and the image output control unit 123 together, and the network I/F 214 connects the LAN 111 and the image output control unit 123 together.

The power supply control unit 215 (control unit) controls power which is supplied to the component elements of the image output apparatus 120. The HDD 216 is a high-capacity storage device and stores, for example, image data. The engine I/F 217 connects the image output control unit 123 and the printer unit 124 together, the fax I/F 218 connects the image output control unit 123 and the fax unit 125 together, and the video I/F 219 connects the video cable 112 and the image output control unit 123 together.

Figure 3:
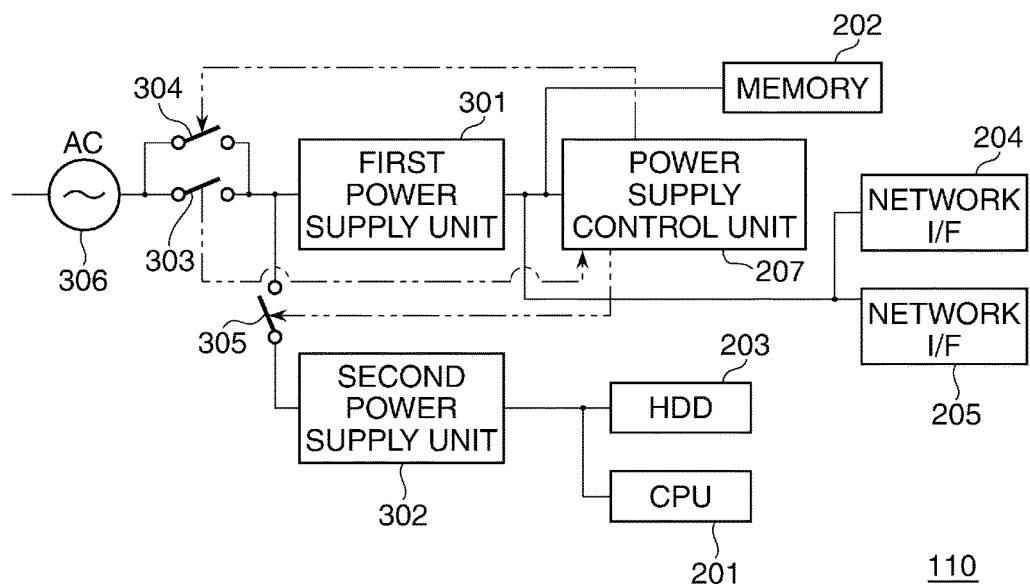
FIG. 3 is a block diagram schematically showing arrangements of a power supply control unit of the image processing apparatus in FIG. 2 and component elements around it.

FIG. 3 is a block diagram schematically showing arrangements of the power supply control unit 207 of the image processing apparatus 110 and component elements around it.

The image processing apparatus 110 in FIG. 3 has the CPU 201, the memory 202, the HDD 203, the network I/Fs 204 and 205, the power supply control unit 207, a first power supply unit 301, a second power supply unit 302, a seesaw switch 303, relay switches 304 and 305, and an AC power supply 306.

The first power supply unit 301 is connected to the AC power supply 306 via the seesaw switch 303 or the relay switch 304, and the second power supply unit 302 is also connected to the AC power supply 306 via the relay switch 305. The memory 202 and the network I/Fs 204 and 205 are connected to the first power supply unit 301, and the CPU 201 and the HDD 203 are connected to the second power supply unit 302.

The first power supply unit 301 converts alternating-current power, which is supplied from the AC power supply 306 via the seesaw switch 303, into direct-current power of which an output voltage is, for example, 3.3 V. The second power supply unit 302 converts alternating-current power, which is supplied from the AC power supply 306 via the seesaw switch 303 and the relay switch 305, into direct-current power of which an output voltage is, for example, 12 V. The seesaw switch 303 is selectively turned on and off by a user, and the power supply control unit 207 is notified of whether the seesaw switch 303 is on or off. The relay switches 304 and 305 are selectively turned on and off by the power supply control unit 207.

When the user has switched the seesaw switch 303 from an off state to an on state, the power supply control unit 207 is notified that the seesaw switch 303 has been turned on and selectively turns on or off the relay switches 304 and 305. When the relay switch 304 is turned on, the first power supply unit 301 supplies power to the memory 202 and the network I/Fs 204 and 205, and when the relay switch 305 is turned on, the second power supply unit 302 supplies power to the CPU 201 and the HDD 203.

Figure 4:
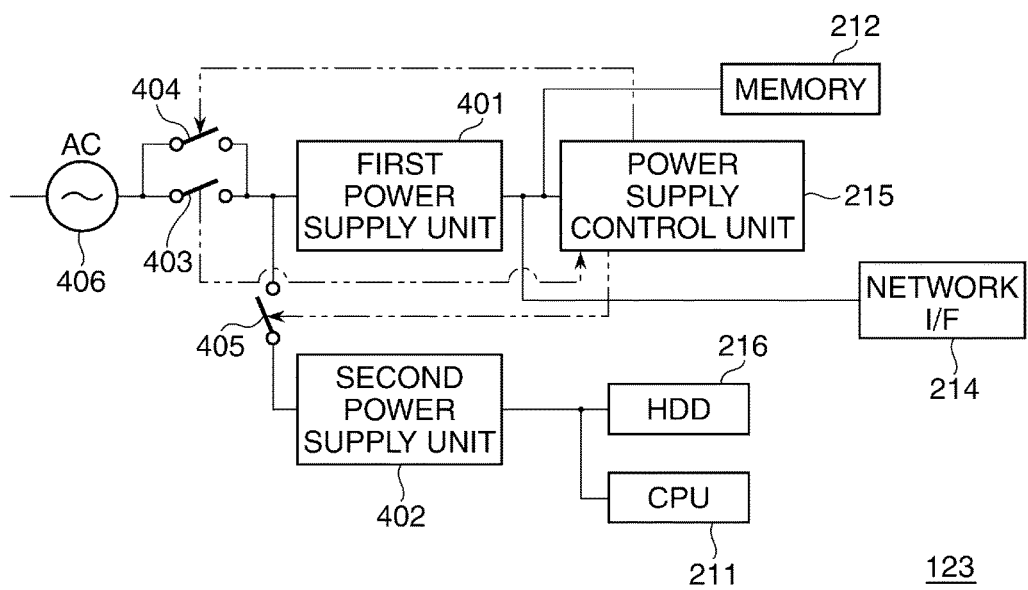
FIG. 4 is a block diagram schematically showing arrangements of a power supply control unit of the image output apparatus in FIG. 2 and component elements around it.

FIG. 4 is a block diagram schematically showing arrangements of the power supply control unit 215 of the image output apparatus 120 in FIG. 2 and component elements around it.

The image output apparatus 120 in FIG. 4 has the CPU 211, the memory 212, the network I/F 214, the power supply control unit 215, and the HDD 216 and also has a first power supply unit 401, a second power supply unit 402, a seesaw switch 403, relay switches 404 and 405, and an AC power supply 406.

The first power supply unit 401 is connected to the AC power supply 406 via the seesaw switch 403 or the relay switch 404, and the second power supply unit 402 is also connected to the AC power supply 406 via the relay switch 405. The memory 212 and the network I/F 214 are connected to the first power supply unit 401, and the CPU 211 and the HDD 216 are connected to the second power supply unit 402.

The first power supply unit 401 converts alternating-current power, which is supplied from the AC power supply 406 via the seesaw switch 403, into direct-current power of which an output voltage is, for example, 3.3 V. The second power supply unit 402 converts alternating-current power, which is supplied from the AC power supply 406 via the seesaw switch 403 and the relay switch 405, into direct-current power of which an output voltage is, for example, 12 V. The seesaw switch 403 is selectively turned on and off by a user, and the power supply control unit 215 is notified of whether the seesaw switch 403 is on or off. The relay switches 404 and 405 are selectively turned on and off by the power supply control unit 215.

When the user has switched the seesaw switch 403 from an off state to an on state, the power supply control unit 215 is notified that the seesaw switch 403 has been turned on and selectively turns on or off the relay switches 404 and 405. When the relay switch 404 is turned on, the first power supply unit 401 supplies power to the memory 212 and the network I/F 214, and when the relay switch 405 is turned on, the second power supply unit 402 supplies power to the CPU 211 and the HDD 216.

In the arrangements shown in FIGS. 3 and 4, the image processing apparatus 110 and the image output apparatus 120 are provided with the individual AC power supplies 306 and 406, respectively, and the power supply control units 207 and 215 control power supplied from the AC power supplies 306 and 406 to the image processing apparatus 110 and the image output apparatus 120, respectively.

Figure 5:
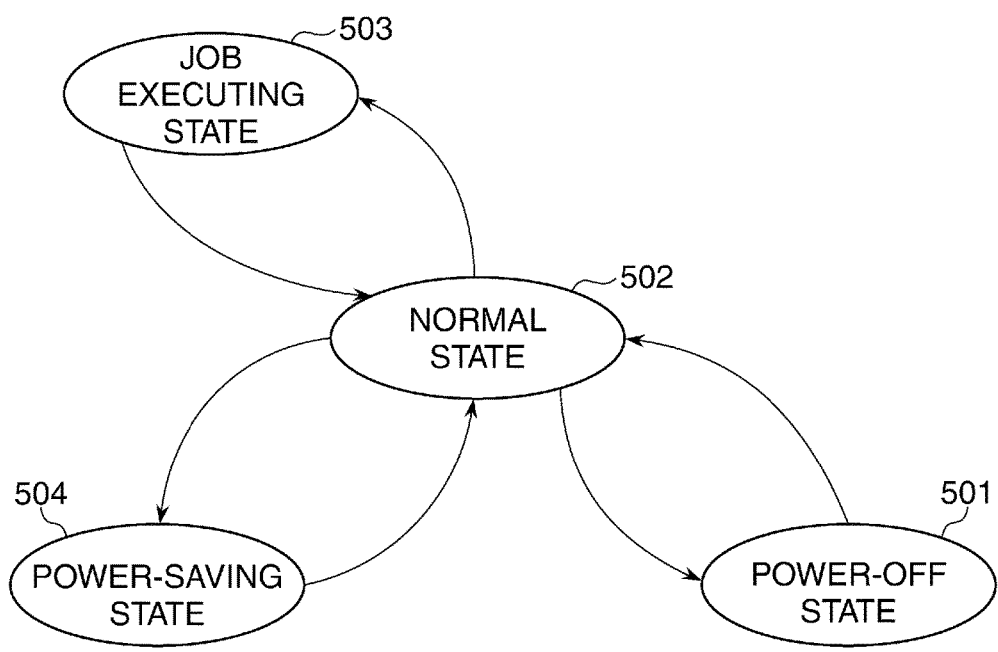
FIG. 5 is a view useful in explaining how the power state of the image processing apparatus or the image output apparatus in FIG. 2 changes.

FIG. 5 is a view useful in explaining how the power state of the image processing apparatus 110 or the image output apparatus 120 in FIG. 2 changes.

Referring to FIG. 5, the image processing apparatus 110 and the image output apparatus 120 assume the following power states: a power-off state 501, a normal state 502, a job executing state 503, and a power-saving state 504. When the power state is the power-off state 501, power is supplied to none of the component elements constituting the image processing apparatus 110 or the image output apparatus 120, and when the power state is the normal state 502, power is supplied to all the component elements constituting the image processing apparatus 110 or the image output apparatus 120. When the power state is the job executing state 503, power is supplied to at least part of the component elements constituting the image processing apparatus 110 or the image output apparatus 120. When the power state is the power-saving state 504, no power is supplied to at least part of the component elements constituting the image processing apparatus 110 or the image output apparatus 120.

The seesaw switches 303 and 403 of the image processing apparatus 110 and the image output apparatus 120 in the power-off state 501 are turned on, the image processing apparatus 110 and the image output apparatus 120 are brought into the normal state 502. On the other hand, the seesaw switches 303 and 403 of the image processing apparatus 110 and the image output apparatus 120 in the normal state 502 are turned off, the image processing apparatus 110 and the image output apparatus 120 are brought into the power-off state 501.

When the image processing apparatus 110 in the normal state 502 is to, for example, receive print data from the client PC 140 and send the print data to the image output apparatus 120, the image processing apparatus 110 goes into the job executing state 503. Also, when the image output apparatus 120 in the normal state 502 is to, for example, print print data received from the image processing apparatus 110, the image output apparatus 120 goes into the job executing state 503.

The image processing apparatus 110 in the job executing state 503 goes into the normal state 502 after sending the print data to the image output apparatus 120. Also, the image output apparatus 120 in the job executing state 503 goes into the normal state 502 after printing the print data received from the image processing apparatus 110.

The image processing apparatus 110 or the image output apparatus 120 in the normal state 502 goes into the power-saving state 504 when a user has issued an instruction to switch into the power-saving state 504, or when no operation has been performed on the image processing apparatus 110 or the image output apparatus 120 even after a lapse of a predetermined timer period. The image processing apparatus 110 or the image output apparatus 120 in the power-saving state 504 goes into the normal state 502 when the image processing apparatus 110 or the image output apparatus 120 has received data from an external apparatus.

It should be noted that the image processing apparatus 110 or the image output apparatus 120 in the power-saving state 504 is able to make a proxy response which is a response to simple data, for example, ARP (address resolution protocol), ICMP (internet control message protocol), or SNMP (simple network management protocol) while being maintained in the power-saving state 504.

Figure 6:
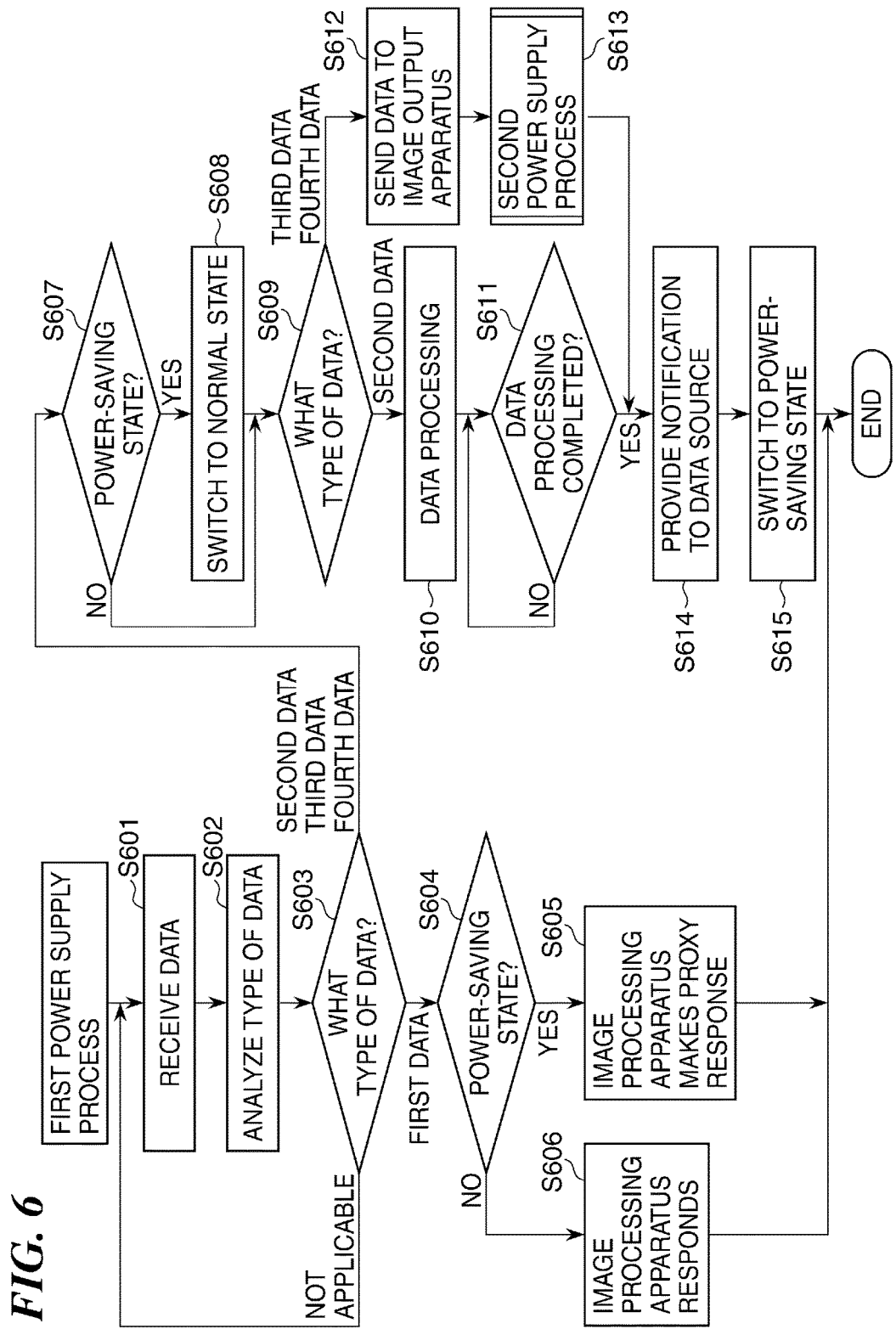
FIG. 6 is a flowchart showing the procedure of a first power supply process which is carried out by a CPU of the image processing apparatus.

FIG. 6 is a flowchart showing the procedure of a first power supply process which is carried out by the CPU 201 of the image processing apparatus 110. The process in FIG. 6 is carried out so as to, when the image processing apparatus 110 receives data from an external apparatus such as the client PC 140, control supply of power to the image processing apparatus 110 based on a type of the data.

Referring to FIG. 6, the CPU 201 receives data from the client PC 140 via the LAN 130 (step S601), analyzes a type of the received data (step S602), and determines whether or not the type of the received data corresponds to any of first data, second data, third data, and fourth data described below (step S603).

Types of data are comprised of, for example, first data for which it is unnecessary to supply power to the image processing apparatus 110, second data for which it is necessary to supply power to the image processing apparatus 110, third data which the image processing apparatus 110 sends to the image output apparatus 120 and for which it is unnecessary to supply power to the image output apparatus 120, and fourth data which the image processing apparatus 110 sends to the image output apparatus 120 and for which it is necessary to supply power to the image output apparatus 120.

As a result of the determination in the step S603, when the type of the received data corresponds to none of the first data, the second data, the third data, and the fourth data, the process returns to the step S601. As a result of the determination in the step S603, when the type of the received data is the first data, the CPU 201 determines whether or not the image processing apparatus 110 is in the power-saving state 504 (step S604).

As a result of the determination in the step S604, when the image processing apparatus 110 is in the power-saving state 504, the power supply control unit 207 controls power supplied from the AC power supply 306 to the image processing apparatus 110 to keep the image processing apparatus 110 in the power-saving state 504, and the image processing apparatus 110 makes a proxy response to the received data (step S605).

On the other hand, when the image processing apparatus 110 is not in the power-saving state 504, the power supply control unit 207 controls power supplied from the AC power supply 306 to the image processing apparatus 110 to keep the image processing apparatus 110 in the normal state 502, and the image processing apparatus 110 responds to the received data (step S606), followed by termination of the present process.

As a result of the determination in the step S603, when the type of the received data is the first data, the second data, the third data, or the fourth data, the CPU 201 determines whether or not the image processing apparatus 110 is in the power-saving state 504 (step S607).

As a result of the determination in the step S607, when the image processing apparatus 110 is in the power-saving state 504, the power supply control unit 207 controls power supplied from the AC power supply 306 to the image processing apparatus 110 to switch the power state of the image processing apparatus 110 from the power-saving state 504 to the normal state 502 (step S608) and determines a type of the received data (step S609). On the other hand, when the image processing apparatus 110 is not in the power-saving state 504, the process proceeds to the step S609 with the step S608 skipped.

As a result of the determination in the step S609, when the type of the data is the second data, the CPU 201 performs processing on the data received by the image processing apparatus 110 (hereafter referred to as "the data processing") (step S610) and determines whether or not the data processing has been completed (step S611). As a result of the determination in the step S611, when the data processing has been completed, the CPU 201 notifies the client PC 140, which is the sender of the data, that the data processing has been completed (step S614), and the power supply control unit 207 controls power supplied from the AC power supply 306 to the image processing apparatus 110 to switch the power state of the image processing apparatus 110 from the normal state 502 to the power-saving state 504 (step S615), followed by termination of the process. As a result of the determination in the step S611, when the data processing has not been completed, the CPU 201 performs the step S611 again.

As a result of the determination in the step S609, when the type of the data is the third data or the fourth data, the CPU 201 sends the received data to the image output apparatus 120 via the LAN 111 (step S612), and carries out a second power supply process in FIG. 7, to be described later (step S613), followed by the process proceeding to step S614.

Figure 7:
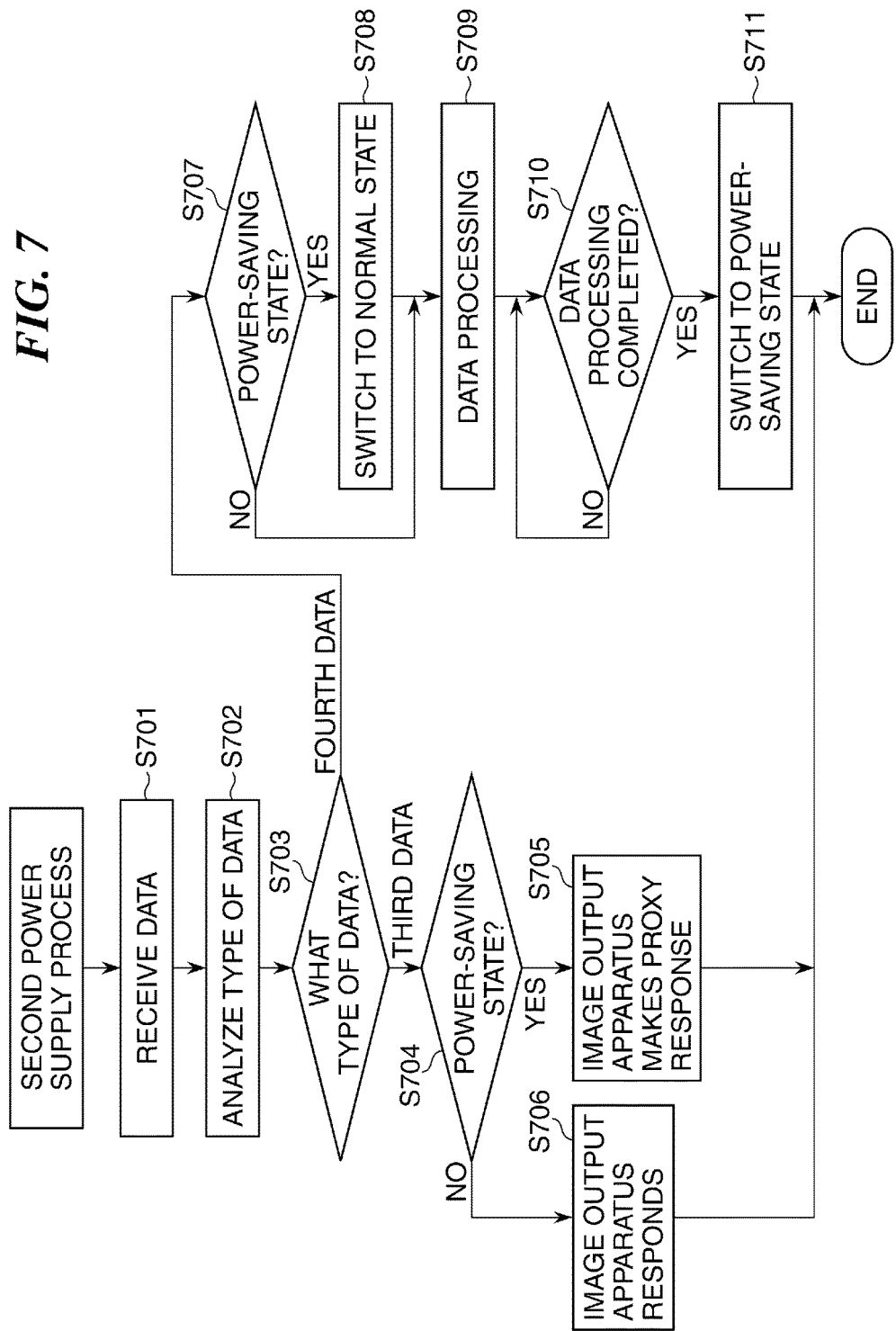
FIG. 7 is a flowchart showing the procedure of a second power supply process which is carried out in step S613 in FIG. 6.

FIG. 7 is a flowchart showing the procedure of the second power supply process which is carried out in the step S613 in FIG. 6. The process in FIG. 7 is carried out by the CPU 211 of the image output apparatus 120 so as to, when the image output apparatus 120 has received data from the image processing apparatus 110, control supply of power to the image output apparatus 120 based on a type of the data.

Referring to FIG. 7, upon receiving data from the image processing apparatus 110 via the LAN 111 (step S701), the CPU 211 analyzes a type of the received data (step S702) and determines whether or not the type of the received data is the third data or the fourth data (step S703).

As a result of the determination in the step S703, when the type of the received data is the third data, the CPU 211 determines whether or not the image output apparatus 120 is in the power-saving state 504 (step S704). As a result of the determination in the step S704, when the image output apparatus 120 is in the power-saving state 504, the power supply control unit 215 controls power supplied from the AC power supply 406 to the image output apparatus 120 to keep the image output apparatus 120 in the power-saving state 504, and the image output apparatus 120 makes a proxy response to the received data (step S705), followed by termination of the present process. On the other hand, when the image output apparatus 120 is not in the power-saving state 504, the power supply control unit 215 controls power supplied from the AC power supply 406 to the image output apparatus 120 to keep the image output apparatus 120 in the normal state 502, and the image output apparatus 120 responds to the received data (step S706), followed by termination of the present process.

As a result of the determination in the step S703, when the type of the received data is the fourth data, the CPU 211 determines whether or not the image output apparatus 120 is in the power-saving state 504 (step S707). As a result of the determination in the step S707, when the image output apparatus 120 is in the power-saving state 504, the power supply control unit 215 controls power supplied from the AC power supply 406 to the image output apparatus 120 to switch the power state of the image output apparatus 120 from the power-saving state 504 to the normal state 502 (step S708). Then, the image output apparatus 120 in the normal state 502 performs the data processing, and after that, the CPU 211 determines whether or not the data processing has been completed (step S710).

As a result of the determination in the step S710, when the data processing has not been completed, the process returns to the step S710, and when the data processing has been completed, the power supply control unit 215 controls power supplied from the AC power supply 406 to the image output apparatus 120 to switch the power state of the image output apparatus 120 from the normal state 502 into the power-saving state 504 (step S711), followed by termination of the process. It should be noted that when it is determined in the step S710 that the data processing has been completed, the image processing apparatus 110 may be notified that the data processing has been completed.

According to the processes in FIGS. 6 and 7, a type of received data is analyzed (steps S601 to S602), and it is determined whether or not the type of the received data is any one of the first data, the second data, the third data, and the fourth data (step S603). When the type of the received data is the first data, and the image processing apparatus 110 is in the power-saving state 504, the power supply control unit 207 controls power supplied from the AC power supply 306 to the image processing apparatus 110 to keep the image processing apparatus 110 in the power-saving state 504, and the image processing apparatus 110 makes a proxy response to the received data (step S605).

When the type of the received data is the second data, the power supply control unit 207 controls power supplied from the AC power supply 306 to the image processing apparatus 110 to switch the power state of the image processing apparatus 110 to the normal state 502 (steps S607 to S615).

Further, when a type of data sent from the image processing apparatus 110 in the normal state 502 to the image output apparatus 120 is the third data, and the image output apparatus 120 is in the power-saving state 504, the power supply control unit 215 controls power supplied from the AC power supply 406 to the image output apparatus 120 to keep the image output apparatus 120 in the power-saving state 504, and the image output apparatus 120 makes a proxy response to the received data (steps S612 to S613, S701 to S705).

When a type of data sent from the image processing apparatus 110 in the normal state 502 to the image output apparatus 120 is the fourth data, the power supply control unit 215 controls power supplied from the AC power supply 406 to the image output apparatus 120 to switch the power state of the image output apparatus 120 to the normal state 502, and the image output apparatus 120 in the normal state 520 performs the data processing (steps S612 to S613, S707 to S711).

Namely, since supply of power from the AC power supplies 306 and 406 to the image processing apparatus 110 and the image output apparatus 120 is controlled by the power supply control units 207 and 215 based on a type of obtained data, power is properly supplied to the image processing apparatus 110 and the image output apparatus 120 from the individual AC power supplies 306 and 406, respectively, without using a control instruction included in the received data.

When a type of data received by the image processing apparatus 110 is the third data or the fourth data, the received data is sent to the image output apparatus 120 (steps S609 and S612). Therefore, it is unnecessary for the image processing apparatus 110 to hold the received data, and hence after sending the received data to the image output apparatus 120, the image processing apparatus 110 is allowed to be brought into the power-saving state 504, and this reduces power consumption of the information processing apparatus 101.

Further, when it is determined that a type of data received by the image processing apparatus 110 is the first data, the image processing apparatus 110 makes a proxy response to the received data (steps S603 to S605). As a result, the image processing apparatus 110 makes a proxy response to the first data to which the image output apparatus 120 does not have to be caused to respond by going so far as supplying power to the image output apparatus 120. This prevents power from being supplied to the image output apparatus 120 lying in the power-saving state 504 and thus reduces power consumption of the information processing apparatus 101.

Moreover, when it is determined that a type of data received by the image output apparatus 120 is the third data, the image output apparatus 120 makes a proxy response to the received data (steps S703 to S705). Even when no power is supplied to the image output apparatus 120, the image output apparatus 120 makes a proxy response. As a result, while being maintained in the power-saving state 504, the image output apparatus 120 deals with the third data to which the image output apparatus 120 does not have to be caused to respond by going so far as supplying power to the image output apparatus 120, and this reduces power consumption of the information processing apparatus 101.

Figure 8:
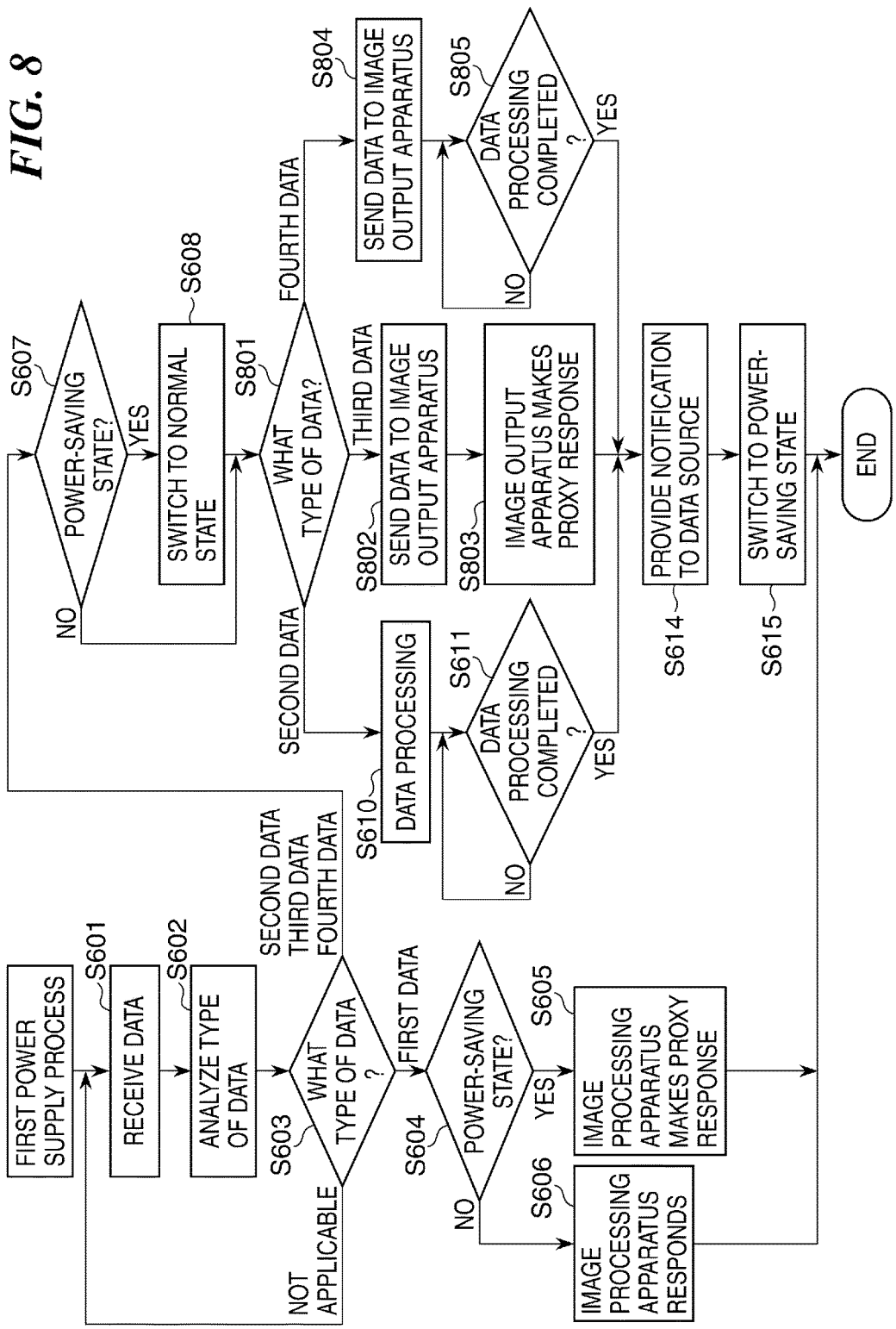
FIG. 8 is a flowchart showing the procedure of a variation of the first power supply process in FIG. 6.

FIG. 8 is a flowchart showing the procedure of a variation of the first power supply process in FIG. 6. The process in FIG. 8 differs from the process in FIG. 6 in that whether a type of received data corresponds to any one of the second data, the third data, and the fourth data is determined in one step. It should be noted that processes in steps S601 to S608, S610 to S611, and S614 to S615 in FIG. 8 are the same as those in the steps S601 to S608, S610 to S611, and S614 to S615 in FIG. 6, and only features different from those of the processes in FIG. 6 will be described below.

In the process in FIG. 8, as a result of the determination in the step S607, when the image processing apparatus 110 is in the power-saving state 504, the CPU 201 of the image processing apparatus 110 switches the power state of the image processing apparatus 110 to normal state 502 (step S608) and determines a type of the received data (step S609). On the other hand, as a result of the determination in the step S607, when the image processing apparatus 110 is not in the power-saving state 504, the process proceeds to step S801 with the step S608 skipped.

As a result of the determination in the step S801, when the type of the received data is the second data, the process proceeds to the step S610, and the subsequent steps are performed, followed by the process proceeding to the step S614. When the type of the received data is the third data, the CPU 201 sends the received data to the image output apparatus 120 (step S802). Here, when the image output apparatus 120 is in the power-saving state 504, the power supply control unit 215 controls power supplied from the AC power supply 406 to the image output apparatus 120 to keep the image output apparatus 120 in the power-saving state 504, and the image output apparatus 120 makes a proxy response to the received data. On the other hand, when the image output apparatus 120 is not in the power-saving state 504, the power supply control unit 215 controls power supplied from the AC power supply 406 to the image output apparatus 120 to keep the image output apparatus 120 in the normal state 502, and the image output apparatus 120 responds to the received data (step S803), followed by the process proceeding to the step S614.

When the type of the received data is the fourth data, the CPU 201 sends the received data to the image output apparatus 120 (step S804). Here, when the image output apparatus 120 is in the power-saving state 504, the power state of the image output apparatus 120 is switched to the normal state 502. On the other hand, when the image output apparatus 120 is not in the power-saving state 504, the image output apparatus 120 is kept in the normal state 502, and it is determined whether or not the image output apparatus 120 in the normal state 502 has completed the data processing (step S805). As a result of the determination in the step S805, when the data processing has not been completed, the process returns to the step S805, and when the data processing has been completed, the process proceeds to the step S614.

According to the processes in FIG. 8, the CPU 201 of the image processing apparatus 110 determines not only whether or not a type of received data is the second data but also whether or not a type of received data is the third data, and further determines whether or not a type of received data is the fourth data (step S801), and therefore, even when the received data is the third data or the fourth data the CPU 211 of the image output apparatus 120 immediately makes a proxy response to the data or performs the data processing without the need to determine a type of the received data. This accelerates processing on data and reduces the burden on the image output apparatus 120.

Figure 9:
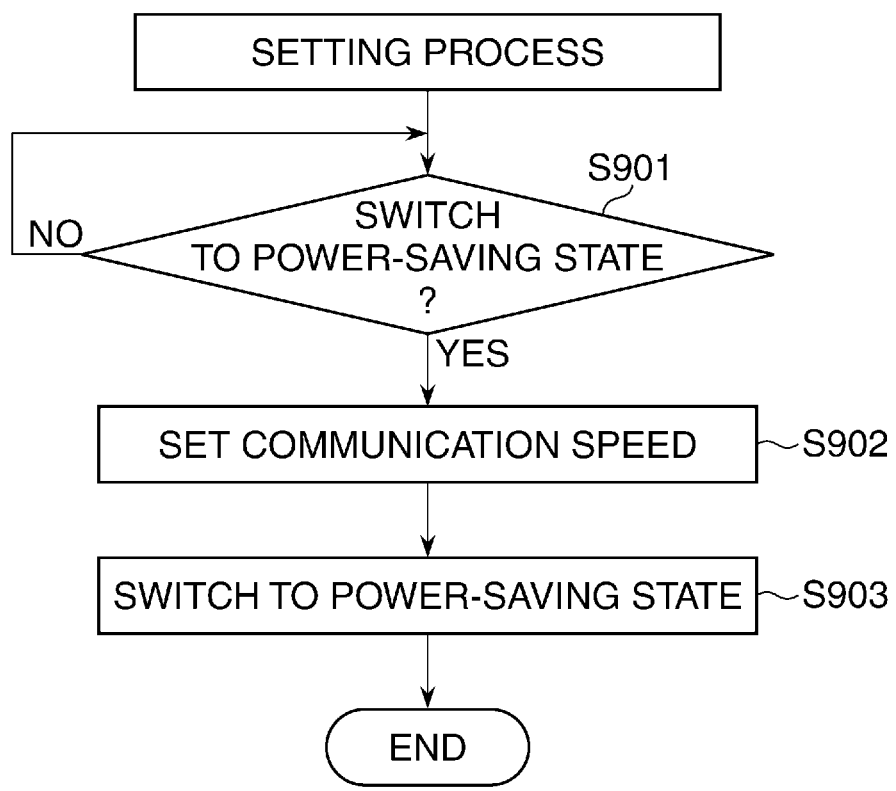
FIG. 9 is a flowchart showing the procedure of a setting process in which the communication speed of a LAN in FIG. 2 is set.

FIG. 9 is a flowchart showing the procedure of a setting process in which the communication speed of the LAN 111 in FIG. 2 is set. The process in FIG. 9 is carried out by the CPU 211 of the image output apparatus 120.

First, the CPU 211 determines whether or not it is possible to switch the power state of the image output apparatus 120 from the normal state 502 to the power-saving state 504 (step S901). As a result of the determination in the step S901, when it is impossible to switch the power state of the image output apparatus 120 to the power-saving state 504, the process returns to the step S901, and when it is possible to switch the power state of the image output apparatus 120 to the power-saving state 504, the CPU 211 sets the communication speed of the LAN 111 again (step S902). Next, the CPU 211 switches the power state of the image output apparatus 120 from the normal state 502 to the power-saving state 504 (step S903) and terminates the present process. It should be noted that the higher the communication speed of the LAN 111, the greater the amount of power consumed by the image output apparatus 120.

According to the process in FIG. 9, since the communication speed of the LAN 111 is set again when the power state of the image output apparatus 120 is to be switched from the normal state 502 to the power-saving state 504 (steps S901 to S902), the communication speed of the LAN 111 at the time when the image output apparatus 120 in the power-saving state 504 makes a proxy response to data sent from the image processing apparatus 110 is set at an appropriate communication speed. This prevents the communication speed of the LAN 111 from being set at an abnormally high communication speed and thus reduces power consumption of the information processing apparatus 101.

Figure 10:
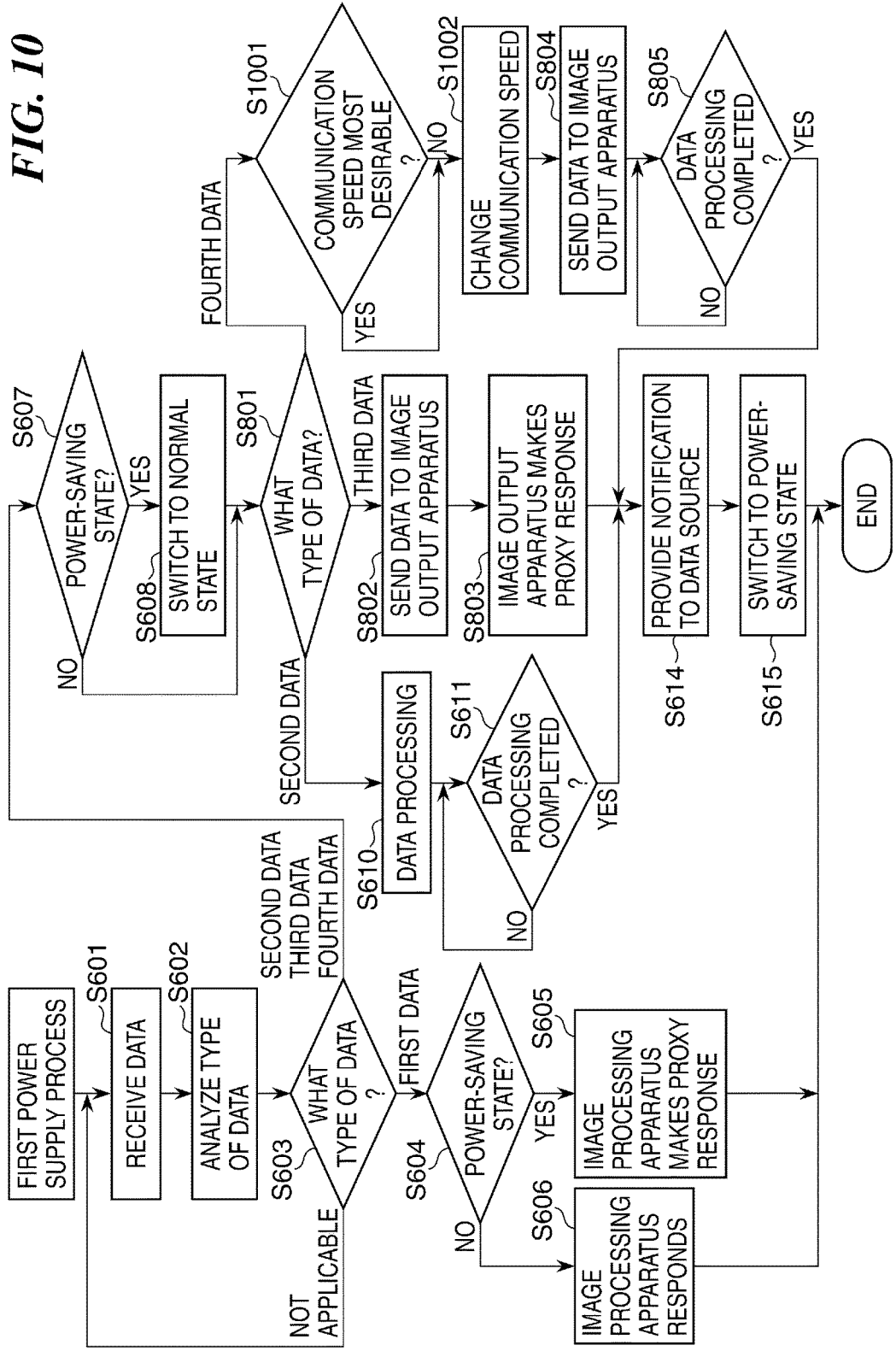
FIG. 10 is a flowchart showing the procedure of a variation of the first power supply process in FIG. 8.

FIG. 10 is a flowchart showing the procedure of a variation of the first power supply process in FIG. 8.

Processes in steps S601 to S608, S610 to S611, S614 to S615, and S801 to S805 in FIG. 10 are the same as those in the steps S601 to S608, S610 to S611, S614 to S615, and S801 to S805 in FIG. 8, and only features different from those of the processes in FIG. 8 will be described below.

In the process in FIG. 10, as a result of the determination in the step S801, when a type of data received by the image processing apparatus 110 is the fourth data, the CPU 201 determines whether or not the communication speed of the LAN 111 at the time when the CPU 201 sends the received data to the image output apparatus 120 is most desirable (step S1001).

It should be noted that the most desirable communication speed of the LAN 111 is the lowest communication speed among communication speeds at which no communication trouble occurs between the image processing apparatus 110 and the image output apparatus 120. As a result of the determination in the step S1001, when the communication speed is most desirable, the process proceeds to the step S804, and when the communication speed is not most desirable, the CPU 201 changes the communication speed (step S1002), followed by the process proceeding to the step S804.

It should be noted that the communication speed of the LAN 111 at the time when the image processing apparatus 110 sends the received data to the image output apparatus 120 is preferably higher than the communication speed of the LAN 111 at the time when the image processing apparatus 110 does not send data to the image output apparatus 120. This enables the image processing apparatus 110 to smoothly send data to the image output apparatus 120 and also reduces power consumed for the LAN 111 when the image processing apparatus 110 does not send data to the image output apparatus 120.

Figure 11:
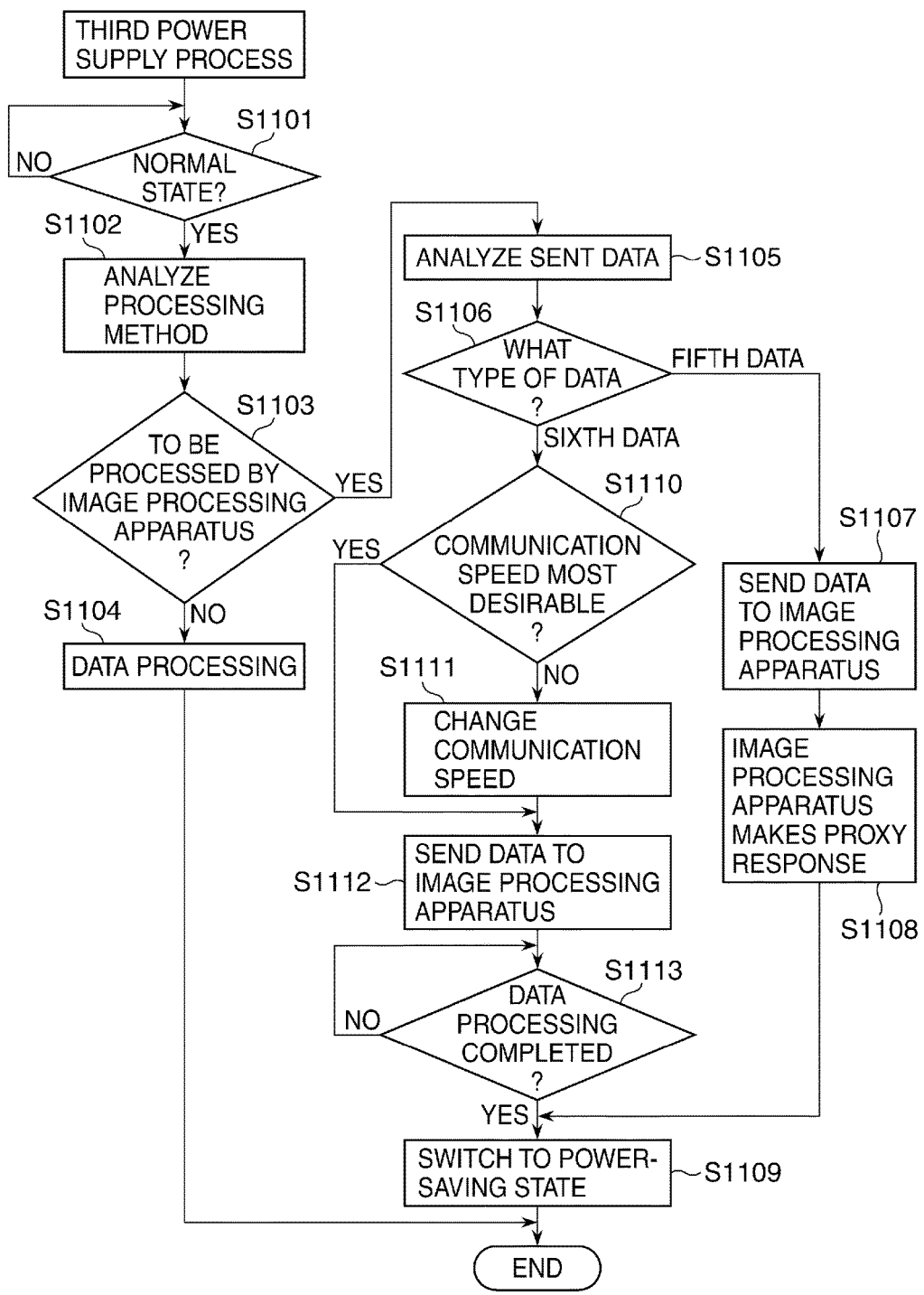
FIG. 11 is a flowchart showing the procedure of a third power supply process which is carried out by a CPU of the image output apparatus.

FIG. 11 is a flowchart showing the procedure of a third power supply process which is carried out by the CPU 211 of the image output apparatus 120. The process in FIG. 11 is carried out when the image output apparatus 120 receives data from the image processing apparatus 110, and the data received by the image output apparatus 120 and subjected to processing by the image output apparatus 120 is sent to the image processing apparatus 110 in the power-saving state 504.

Referring to FIG. 11, first, the CPU 211 determines whether or not the power state of the image output apparatus 120 having received data is the normal state 502 (step S1101). As a result of the determination in the step S1101, when the power state of the image output apparatus 120 is not the normal state 502, the process returns to the step S1101, and when the power state of the image output apparatus 120 is the normal state 502, the CPU 211 performs an analysis to determine whether or not the received data should be processed in either the image processing apparatus 110 or the image output apparatus 120 (analysis of a processing method) (step S1102) and determines whether or not the received data should be processed in the image processing apparatus 110 (step S1103).

As a result of the determination in the step S1103, when the received data should not be processed in the image processing apparatus 110 according to the analysis, the image output apparatus 120 performs the data processing (step S1104), followed by termination of the present process.

As a result of the determination in the step S1103, when the received data should be processed in the image processing apparatus 110 according to the analysis, the CPU 211 performs the data processing and analyzes the data (processed data) that is to be sent to the image processing apparatus 110 (step S1105), and determines a type of the data to be sent, and more specifically, whether a type of the data to be sent is fifth data for which it is unnecessary to supply power to the image processing apparatus 110 or sixth data for which it is necessary to supply power to the image processing apparatus 110 (step S1106).

As a result of the determination in the step S1106, when the type of the data to be sent is the fifth data, the CPU 211 sends the data to the image processing apparatus 110 (step S1107). Here, when the image processing apparatus 110 is in the power-saving state 504, the power supply control unit 207 controls power supplied from the AC power supply 306 to the image processing apparatus 110 to keep the image processing apparatus 110 in the power-saving state 504, and the image processing apparatus 110 makes a proxy response to the received data (step S1108). Then, the CPU 211 switches the power state of the image output apparatus 120 from the normal state 502 to the power-saving state 504 (step S1109), followed by termination of the present process.

As a result of the determination in the step S1106, when the type of the data to be sent is the sixth data, the CPU 211 determines whether or not the communication speed of the LAN 111 is most desirable (step S1110). As a result of the determination in the step S1110, when the communication speed of the LAN 111 is not most desirable, the CPU 201 changes the communication speed (step S1111) and sends the data to the image processing apparatus 110 (step S1112). On the other hand, when the communication speed is most desirable, the process proceeds to the step S1112.

It should be noted that the communication speed of the LAN 111 at the time when the image output apparatus 120 sends processed data to the image processing apparatus 110 is preferably higher than the communication speed of the LAN 111 at the time when the image output apparatus 120 does not send processed data to the image processing apparatus 110. This enables the image output apparatus 120 to smoothly send processed data to the image processing apparatus 110 and also reduces power consumed for the LAN 111 when the image output apparatus 120 does not send data to the image processing apparatus 110.

The CPU 211 then determines whether or not the data processing has been completed in the image processing apparatus 110 (step S1113). As a result of the determination in the step S1113, when the data processing has been completed, the process proceeds to the step S1109, and when the data processing has not been completed, the process returns to the step S1113.

Figure 12:
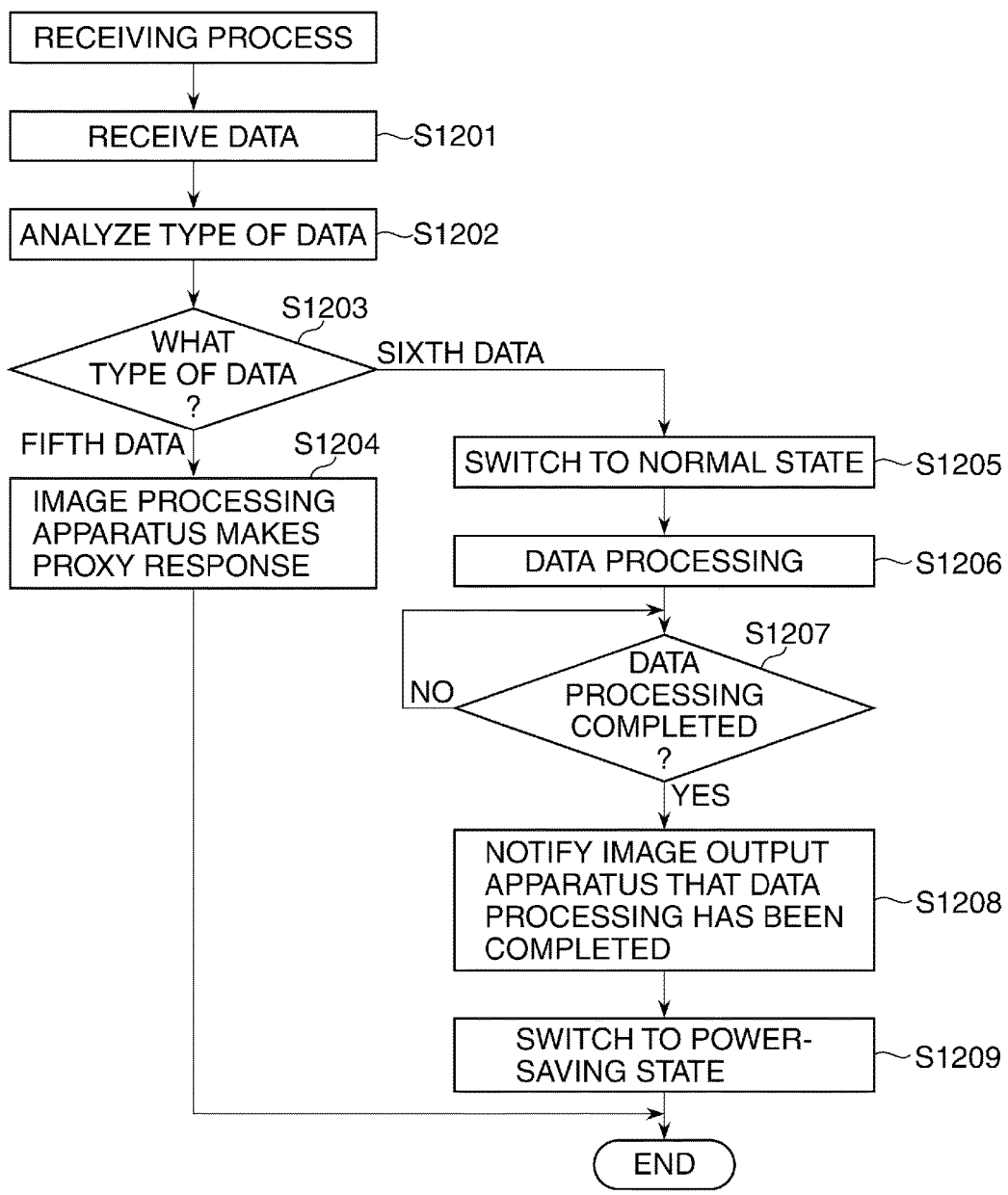
FIG. 12 is a flowchart showing the procedure of a receiving process in which data sent in step S1107 or step S1112 in FIG. 11 is received.

FIG. 12 is a flowchart showing the procedure of a receiving process in which data sent in the step S1107 or the step S1112 in FIG. 11 is received. The process in FIG. 12 is carried out by the CPU 201 of the image processing apparatus 110 when the image processing apparatus 110 in the power-saving state 504 has received data from the image output apparatus 120.

Referring to FIG. 12, first, the CPU 201 receives data from the image output apparatus 120 (step S1201), analyzes a type of the received data (step S1202), and determines a type of the received data (step S1203). As a result of the determination in the step S1203, when the type of the received data is the fifth data, the power supply control unit 207 controls power supplied from the AC power supply 306 to the image processing apparatus 110 to keep the image processing apparatus 110 in the power-saving state 504, and the image processing apparatus 110 makes a proxy response to the received data (step S1204), followed by termination of the present process. As a result of the determination in the step S1203, when the type of the received data is the sixth data, the power supply control unit 207 controls power supplied from the AC power supply 306 to the image processing apparatus 110 to supply power to the image processing apparatus 110, switching the power state of the image processing apparatus 110 to the normal state 502 (step S1205). The CPU 211 then performs the data processing on the received data (step S1206) and determines whether or not the data processing has been completed (step S1207).

As a result of the determination in the step S1207, when the data processing has not been completed, the process returns to the step S1207. On the other hand, when the data processing has been completed, the CPU 201 notifies the image output apparatus 120 that the data processing has been completed (step S1208), and the power supply control unit 207 controls power supplied from the AC power supply 306 to the image processing apparatus 110, switching the power state of the image processing apparatus 110 from the normal state 502 to the power-saving state 504 (step S1209), followed by termination of the present process.

According to the processes in FIGS. 11 and 12, when data received by the image output apparatus 120 is the fifth data in the case where the image output apparatus 120 is to send the received data to the image processing apparatus 110 in the power-saving state 504 (steps S1107 and S1112), the power supply control unit 207 controls power supplied from the AC power supply 306 to the image processing apparatus 110 to keep the image processing apparatus 110 in the power-saving state 504 (step S1204). On the other hand, when data received by the image output apparatus 120 is the sixth data, the power supply control unit 207 controls power supplied from the AC power supply 306 to the image processing apparatus 110, switching the power state of the image processing apparatus 110 to the normal state 502 (step S12005).

Namely, since supply of power to the image processing apparatus 110 is controlled based on received data, power is prevented from always being supplied to the image processing apparatus 110 when the image processing apparatus 110 in the power-saving state 504 has obtained data, and this reduces power consumption of the information processing apparatus 101.

Moreover, when it is determined that a type of received data is the fifth data, the image processing apparatus 110 makes a proxy response to the received data (step S1204). Even when no power is supplied to the image processing apparatus 110, the image processing apparatus 110 is able to make a proxy response, and hence while being maintained in the power-saving state 504, the image processing apparatus 110 deals with the fifth data to which the image processing apparatus 110 does not have to be caused to respond by going so far as supplying power to the image processing apparatus 110, and this reduces power consumption of the information processing apparatus 101.

Further, since the speed of communication between the image processing apparatus 110 and the image output apparatus 120 at the time when the image output apparatus 120 sends processed data to the image processing apparatus 110 is higher than the speed of communication at the time when the image output apparatus 120 does not send processed data to the image processing apparatus 110 (steps S1110 to S1112), the image output apparatus 120 smoothly sends processed data to the image processing apparatus 110.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-144215, filed Jul. 14, 2014, which is hereby incorporated by reference herein in its entirety.

What is claimed is:

1. An image processing apparatus excluding a printing apparatus for printing an image, the image processing apparatus comprising:
a power supply unit that receives alternating current (AC) power, the power supply unit being different from another power supply unit included in the printing apparatus such that power states of the image processing apparatus are controlled independent of power states of the printing apparatus;
a first network interface that connects the image processing apparatus to and communicates with an external apparatus but not the printing apparatus via a first network not including the printing apparatus, the first network interface capable of receiving data from the external apparatus even when the image processing apparatus is in a first power state in which the power supply unit supplies power to a first part including less than all devices that constitute the image processing apparatus;
a second network interface that connects the image processing apparatus to and communicates with the printing apparatus but not the external apparatus via a second network separate from the first network;
a memory that stores programs; and
a processor that executes the programs stored in the memory to:
shift the image processing apparatus to the first power state;
while not shifting the image processing apparatus from the first power state, determine a type of the data received via the first network interface when the image processing apparatus is in the first power state;
in a case where it is determined that the data received from the external apparatus by the first network interface when the image processing apparatus is in the first power state is a first type data which can be responded without shifting the image processing apparatus from the first power state, respond to the data received via the first network interface without shifting the image processing apparatus from the first power state; and
in a case where it is determined that the data received from the external apparatus by the first network interface when the image processing apparatus is in the first power state is a second type data which is necessary to be transferred to the printing apparatus via the second network interface, shift the image processing apparatus from the first power state to a second power state in which the power supply unit supplies power to the first part including less than all devices that constitute the image processing apparatus and to another device, which is also included in the image processing apparatus, to transfer the received data to the printing apparatus,
wherein in a case where the data received from the external apparatus by the first network interface when the image processing apparatus is in the first power state is the second type data, the image processing apparatus transfers the received second type data to the printing apparatus via the second network interface after shifting from the first power state to the second power state.

2. The image-processing apparatus of claim 1, wherein, in the case where the data received from the external apparatus by the first network interface when the image processing apparatus is in the first power state is the first type data, the image processing apparatus responds to the external apparatus based on a result of processing the received first type data, without shifting the image processing apparatus from the first power state.

3. The image-processing apparatus of claim 1, wherein the processor further executes the programs stored in the memory to determine a type of the data received via the first network interface when the image processing apparatus is in the first power state by analyzing the subject received data without shifting the image processing apparatus from the first power state.

4. The image-processing apparatus of claim 1, wherein the processor further executes the programs stored in the memory to respond to the data received from the external apparatus without performing any inquiry to the printing apparatus.

5. The image-processing apparatus of claim 1, wherein the processor further executes the programs stored in the memory to transfer the data received from the external apparatus to the printing apparatus even when the printing apparatus is in a state where power is supplied only to the first part including less than all devices that constitute the printing apparatus.

6. The image-processing apparatus of claim 1, wherein the another device included in the image processing apparatus is not the printing apparatus.

7. A data processing method implemented by an image processing apparatus which excludes a printing apparatus for printing an image and which has a power supply unit that receives alternating current (AC) power, the power supply unit being different from another power supply unit included in the printing apparatus, a first network interface for connecting the image processing apparatus with an external information processing apparatus but not the printing apparatus, and a second network interface for connecting the image processing apparatus with the printing apparatus but not the external information processing apparatus, the data processing method comprising:
shifting the image processing apparatus to a first power state in which the power supply unit supplies power to a first part including less than all devices that constitute the image processing apparatus such that power states of the image processing apparatus are controlled independent of power states of the printing apparatus;
when the image processing apparatus is in the first power state, receiving data from the external information processing apparatus via the first network interface;
while not shifting the image processing apparatus from the first power state, determining a type of the data received via the first network interface when the image processing apparatus is in the first power state;
in a case where it is determined that the type of the data received via the first network interface when the image processing apparatus is in the first power state is a type which can be responded without shifting the image processing apparatus from the first power state, responding to the data received from the external information processing apparatus via the first network interface without shifting the image processing apparatus from the first power state; and
in a case where it is determined that the type of the data received via the first network interface when the image processing apparatus is in the first power state is a type which is necessary to be transferred to the printing apparatus via the second network interface, shifting the image processing apparatus from the first power state to a second power state in which the power supply unit supplies power to the first part including less than all devices that constitute the image processing apparatus and to another device included in the image processing apparatus, and then transferring, to the printing apparatus, the data received via the first network interface when the image processing apparatus is in the first power state.

8. The data processing method of claim 7, further comprising determining a type of the data received via the first network interface when the image processing apparatus is in the first power state by analyzing the subject received data without shifting the image processing apparatus from the first power state.

9. The data processing method of claim 7, further comprising responding to the data received from the external information processing apparatus without performing any inquiry to the printing apparatus.

10. The data processing method of claim 7, further comprising transferring the data received from the external information processing apparatus to the printing apparatus even when the printing apparatus is in a state where power is supplied only to the first part including less than all devices that constitute the printing apparatus.

11. The data processing method of claim 7, wherein the another device included in the image processing apparatus is not the printing apparatus.

12. The data processing method of claim 7, wherein the second network interface is not connected to a local area network to which the external information processing apparatus is connected but connected to the printing apparatus using LAN (local area network) connection.

13. The image-processing apparatus of claim 1, wherein, in the first power state, power is supplied to the first part including less than all devices that constitute the image processing apparatus but is not supplied to another part of the all devices.

14. The data processing method of claim 7, wherein, in the first power state, power is supplied to the first part including less than all devices that constitute the image processing apparatus but is not supplied to another part of the all devices.

15. The image processing apparatus according to claim 1, further comprising a system bus connecting the first network interface and the second network interface to each other.

16. An image processing apparatus which connects to a printing apparatus via a line that is not connected to an external apparatus different from both the image processing apparatus and the printing apparatus, the image processing apparatus comprises:
  a power supply control unit that controls a power supply state of the image processing apparatus such that power states of the image processing apparatus are controlled independent of power states of the printing apparatus, the power supply control unit being different from another power supply control unit that is included in the printing apparatus and controls a power supply state of the printing apparatus;
  a first network interface that connects the image processing apparatus to and communicates with the external apparatus but not the printing apparatus via a network not including the printing apparatus; and
  a second network interface that connects the image processing apparatus to and communicates with the printing apparatus but not the external apparatus via the line different from the network;
  wherein the image processing apparatus:
    shifts to a first power state in which the first network interface is capable of receiving data from the external apparatus and the power supply control unit controls the power supply state of the image processing apparatus such as to supply power to only a part of all devices that constitute the image processing apparatus;
    determines a type of the data received from the external apparatus by the first network interface when the image processing apparatus is in the first power state without shifting from the first power state; and
    if it is determined that the data received from the external apparatus by the first network interface when the image processing apparatus is in the first power state is a predetermined type data which is necessary to be transferred to the printing apparatus via the line:
      i) shifts from the first power state to a second power state in which the power supply control unit controls the power supply state of the image processing apparatus such as to supply power to the part of the all devices and to another part of the all devices which is included in the image processing apparatus and is different from the part of the all devices; and
      (ii) transfers the data received from the external apparatus by the first network interface when the image processing apparatus is in the first power state, to the printing apparatus via the second network interface after shifting from the first power state to the second power state.

17. The image processing apparatus according to claim 16, further comprising a system bus connecting the first network interface and the second network interface to each other.

* * * * *